United States Patent
Watanabe (10) Patent No.: US 6,532,623 B1
(45) Date of Patent: Mar. 18, 2003

(54) CASTER (75) Inventor: Yasukuni Watanabe, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 09/831,309

(22) PCT Filed: Sep. 20, 2000

(86) PCT No.: PCT/JP00/06409

§ 371 (c)(1),
(2), (4) Date: May 8, 2001

(87) PCT Pub. No.: WO01/21419

PCT Pub. Date: Mar. 29, 2001

(30) Foreign Application Priority Data

Sep. 21, 1999 (JP) .............................. 11-267169
Sep. 5, 2000 (JP) ....................... 2000-268661

(51) Int. Cl.[7] ............................. A47B 91/00; B60B 33/00
(52) U.S. Cl. ............................. 16/35 D; 16/44; 267/257
(58) Field of Search ................. 16/44, 35 D; 267/257, 267/292

(56) References Cited

U.S. PATENT DOCUMENTS

| | | | | |
|---|---|---|---|---|
| 2,066,187 A | * | 12/1936 | Piron | 16/DIG. 36 |
| 3,323,786 A | * | 6/1967 | Boschi | 16/44 |
| 3,566,433 A | * | 3/1971 | Lewin | 16/44 |
| 4,462,138 A | * | 7/1984 | Black | 16/44 |
| 4,559,669 A | | 12/1985 | Bonzer et al. | |
| 4,685,174 A | * | 8/1987 | Hager | 16/44 |
| 5,394,589 A | * | 3/1995 | Braeger et al. | 16/44 |
| 5,899,475 A | * | 5/1999 | Verhaeg et al. | 16/35 D |
| 6,149,169 A | * | 11/2000 | Chelgren | 280/647 |

FOREIGN PATENT DOCUMENTS

| | | | |
|---|---|---|---|
| GB | 2063187 | * | 6/1981 |
| JP | 50-1214 | | 1/1975 |
| JP | 57-10542 | | 1/1982 |
| JP | 61-162634 | | 10/1986 |
| JP | 6-199101 | | 7/1994 |
| JP | 7-35837 | | 7/1995 |
| JP | 7-329505 | | 12/1995 |
| JP | 9-300931 | | 11/1997 |
| JP | 11-91303 | | 4/1999 |

* cited by examiner

Primary Examiner—Thomas B. Will
Assistant Examiner—Thomas A. Beach
(74) Attorney, Agent, or Firm—Rabin & Berdo, PC (57) ABSTRACT

A caster which is mounted in a trolley or the like having a bracket 2 connected to a body of a vehicle; a link 3 connected to rotate on the bracket 2; vehicle wheels 4 connected to rotate on the link 3; and a compressible rubber block 20 which deforms as the link 3 rotates. The compressible rubber block forms an initial compressible part 23 which partially eliminates a surface area of the compressible rubber block. In this manner it is possible to restrain input forces on the vehicle body by smoothing out the rotation of the link 3.

10 Claims, 10 Drawing Sheets

CASTER

FIELD OF THE INVENTION

This invention relates to a caster which is provided with a damping mechanism and which is mounted on a wheelchair or the like.

BACKGROUND OF THE INVENTION

A prior art caster for absorbing shocks comprises a bracket which is connected to a body, a link which is connected to rotate with the bracket and which supports a wheel, and a cushioning which is interposed between the bracket and the link.

DISCLOSURE OF THE INVENTION

However the carrying load and shock-absorbing efficiency of this type of caster are determined by the resilient characteristics of the cushioning rubber. As a result, the problem has arisen that the effectiveness of an initial movement is reduced if the cushioning rubber is too hard. Conversely metal contact may result if the cushioning rubber is too soft.

The caster is provided with a metal spring has resulted in the problem that the size of the caster is increased and thus it is difficult to assemble this type of caster into the wheelchair currently in use.

This invention has the object of providing a caster which solves the above problems.

In order to solve the above problems, this invention provides a caster comprising a bracket which is connected with a body of a vehicle, a link which is connected with the bracket rotatably, a wheel which is connected with the link rotatably, and a compressible rubber block which deforms according to the rotation of the link, wherein the compressible rubber block has an initial compressible part which partially decreases a cross section of the compressible rubber block. As a result, the compressible rubber block can smooth out the rotation of the link and restrain input forces on the body by the initial compressible part deforming with respect to an initial input force on the wheels.

When a large input force is applied on the wheels, the input force on the body is restrained by limiting the rotation range of the link which thus prevents metal contact comprising the link making direct contact with the bracket etc. This is enabled by the deformation of sections other than the initial compressible part after the initial compressible part has deformed.

A torsional rubber bush is disposed co-axially to the rotational axis of the link and a compressible rubber block is disposed between the bracket and the link. As a result, the size of the caster can be made reduced.

The initial compressible rubber block is made a cylindrical shape and a part of the cylindrical compressible rubber block is formed a cone shape which has a reduced cross section. As a result, when the compressible rubber block is compressed, deformation begins from the initial compressible part which has a smaller cross section. Thereafter the elastic recovery force rapidly increases due to the fact that conical parts deform from the side which has the smaller cross section together with increases in the degree of deformation. The conical parts are positioned to sandwich the initial compressible part.

The compressible rubber block has a cylindrical shape and at least a part of the cylindrical compressible rubber block as the initial compressible part is formed so that a cross section of the part is smaller than other parts. As a result, when the compressible rubber block is compressed, firstly deformation begins from the initial compressible part which has a smaller cross section. Thereafter the elastic recovering force rapidly increases due to the fact that each large diameter part which sandwiches the initial compressible part undergoes deformation. In this manner, shocks on the wheel from the road surface are effectively absorbed and input forces on the body can be restrained by preventing metal contact resulting from the link coming into contact with the bracket.

A retainer is provided at periphery of the compressible rubber block, and the retainer come into contact with a member supporting the compressible rubber block according to the deformation of the initial compressible part. As a result, when the compressible rubber block is compressed, it is compressed firstly from the initial compressible part which has a smaller cross section and the retainer abuts with the a member which supports the initial compressible part. As a result, the elastic recovering force is rapidly increased. In this manner, shocks on the wheel from the road surface are effectively absorbed and input forces to the vehicle body can be restrained by preventing metal contact due to the link coming into contact with the bracket.

Annular spacers are respectively provided at the top side and bottom side of the compressible rubber block, a maximum amount of compression of the compressible rubber block is determined by which the respective spacers contacts as the deformation of the compressible rubber block. Therefore the compression ratio of the compressible rubber block can be limited by the contact between the spacers. Therefore it is possible to accurately control the amount of stroke of the casters and therefore restrain individual differences in damping performance resulting from differences quality in the manufacture of the compressible rubber blocks.

The annular spacer has a height regulation member which enables a maximum amount of compression of the compressible rubber block to be varied. Therefore it is possible to vary the amount of stroke of the caster in a simple manner.

The cross section of the initial compressible rubber block is gradually decreased toward a top of the compressible rubber block to a deformation direction of the compressible rubber block, annular spacers are respectively provided at the top side and bottom side of the compressible rubber block and the respective spacers contacts with the initial compressible rubber block according to the deformation of the compressible rubber block. Therefore as the initial compressible section is compressed, the end of the block abuts with the end face of the spacer. As a result, when the compressible rubber block is compressed, deformation begins from the initial compressible part which has a smaller surface area. Therefore the input forces on the vehicle body can be restrained by smoothing out the rotation of the link. When a large input force is applied to the vehicle wheels, the initial compressible part of the compressible rubber block comes into contact with the end face of the spacer. Therefore the elastic recovering force of the compressible rubber block increases sharply. As a result, it is possible to restrain input forces on the vehicle body by limiting the rotation range of the link.

A torsional rubber bush as the compressible rubber block is provided which deforms to a torsion direction as the link rotates As a result, the torsional rubber cushion forms a torsion in response to loads on the vehicle body to determine the inclination of the link. The compressible rubber block is compressed in response to input forces on the vehicle wheels and swing in the link is damped. Thus it is possible to set the load bearing characteristics and damping characteristics of the caster on the basis of variations in the hardness or shape of the torsional rubber bush and the compressible rubber block.

DESCRIPTION OF THE PREFERRED EMBODIMENTS

In order to describe the invention in greater detail, the preferred embodiments will be outlined below with reference to the accompanying figures.

Figure 1:
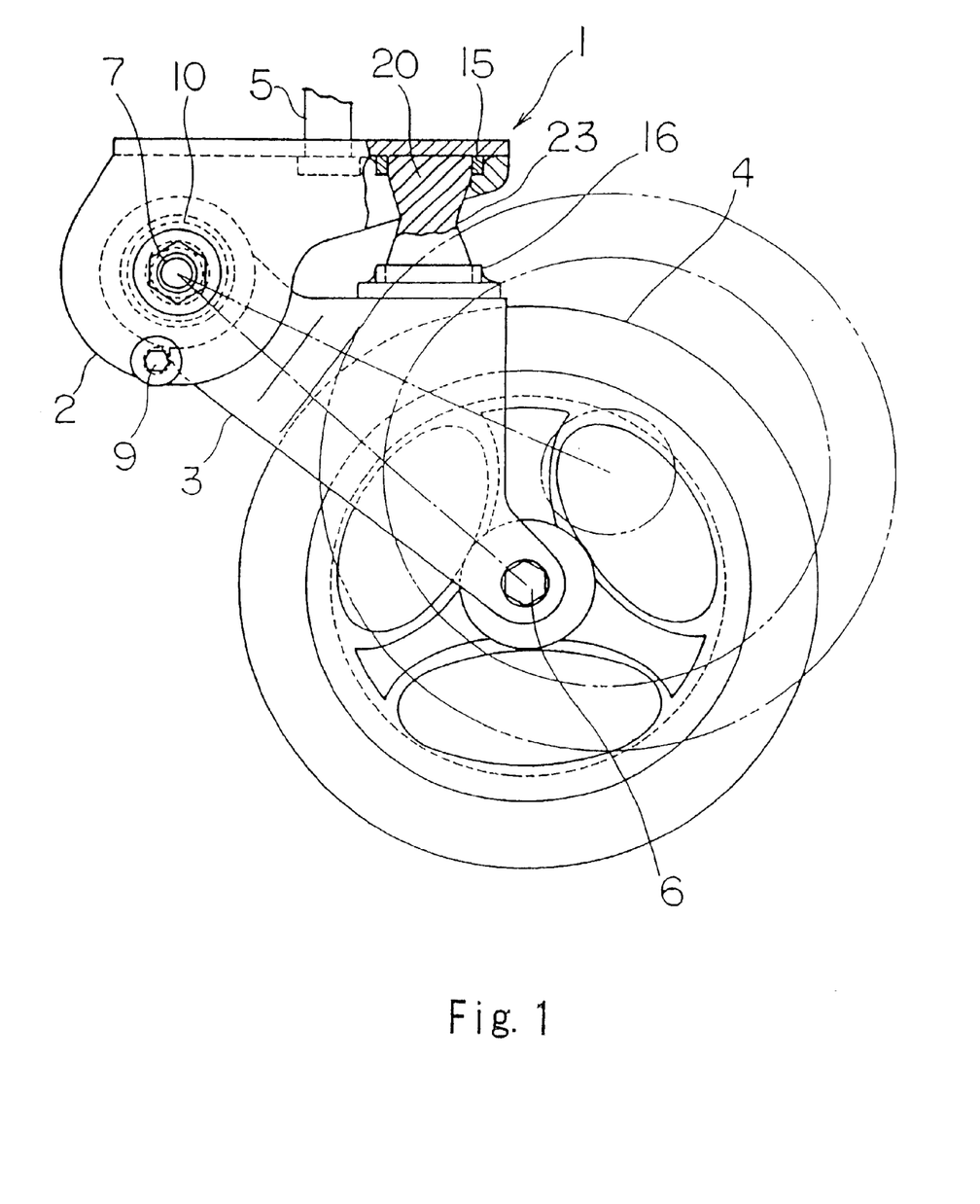
FIG. 1 is a side view of a caster according to a first embodiment of this invention.

Referring to FIG. 1 of the drawings, a caster 1 comprises a bracket 2 which is fixed to a body for example of a wheelchair, a link 3 which is supported to rotate on the bracket 2 and a wheel 4 which is supported to rotate on a front end of the link 3.

The bracket 2 is U-shaped in cross section and is fixed to the vehicle body by a bolt 5 which pierces an upper end of the bracket 2. Alternatively the bracket 2 may be connected to the body through a bearing, the link 3 may be adapted to swing about a perpendicular axis (transverse direction) in the direction in which the wheels 4 are moving.

The link 3 is U-shaped in cross section and a bolt 6 is provided which pierces a front end of the link 3. The bolt 6 supports the wheels 4 to rotate through a bearing (not shown).

Figure 2:
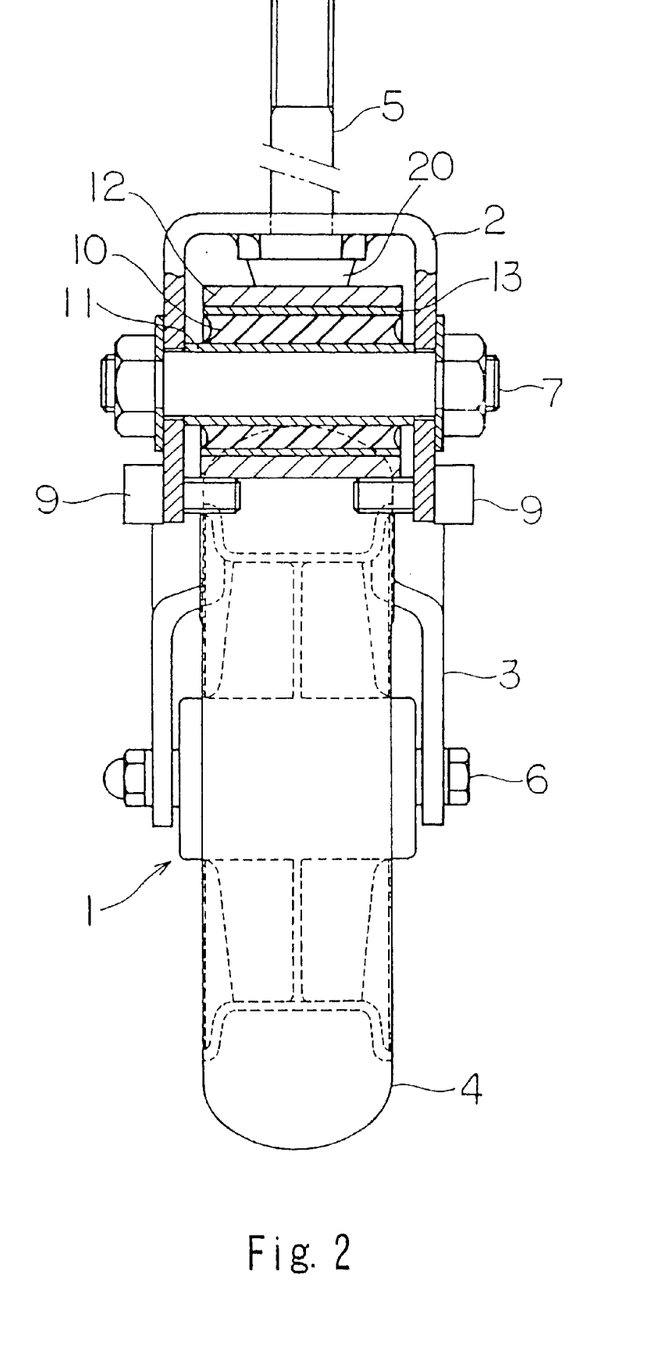
FIG. 2 is a front view of a caster according to a first embodiment of this invention.

As shown in FIG. 2, the link 3 is supported to rotate horizontally (vertical direction) with respect to the bracket 2 through a torsional rubber bush 10 which comprises a rubber material. An outer sleeve 13 and an inner sleeve 11 are fixed by vulcanization to inner and outer peripheral faces of the cylindrical torsional rubber bush 10. The torsional rubber bush 10 is press fitted to a sleeve 12 which is provided on a rotational center of the link 3. On the other hand, the inner sleeve 11 is fixed to the bracket 2 by a bolt 7.

Under design standards, the torsional rubber bush 10 is attached so that during a torsional deformation, its inner and outer peripheral faces both undergo relative displacement in a peripheral direction. The torsional rubber bush 10 rotates the link 3 downwardly with the elastic recovering force. A torsional deformation is generated in the torsional rubber bush 10 in response to the load on the body which thus determines the inclination of the link 3 to a horizontal line. When the link 3 makes contact with a stopper bolt 9 which is described below, the torsional rubber bush 10 may be set not to generate a torsional deformation.

A pair of stopper bolts 9 are fixed to the bracket 2 to limit downward rotation of the link 3. When a load is not applied to the caster 1, contact of the link 3 with each stopper bolt 9 is maintained by the elastic recovering force of the torsional rubber bush 10.

A compressible rubber block 20 is mounted on the bracket 2 which is compressed by the upward rotation of the link 3. Swing of the link 3 is restrained by the link 3 rotating as the compressible rubber block 20 is compressed in response to an input force on the wheels 4 from the road surface. Furthermore metal contact resulting from the wheels 4 contacting the bracket 2 or the vehicle body is prevented.

An annular spacer 15 is fixed to the bracket 2 and an upper part of the compressible rubber block 20 is retained in an inner side of the spacer 15.

An annular spacer 16 is fixed to the link 3 and a lower part of the compressible rubber block 20 is retained in an inner side of the spacer 16.

Figure 3:
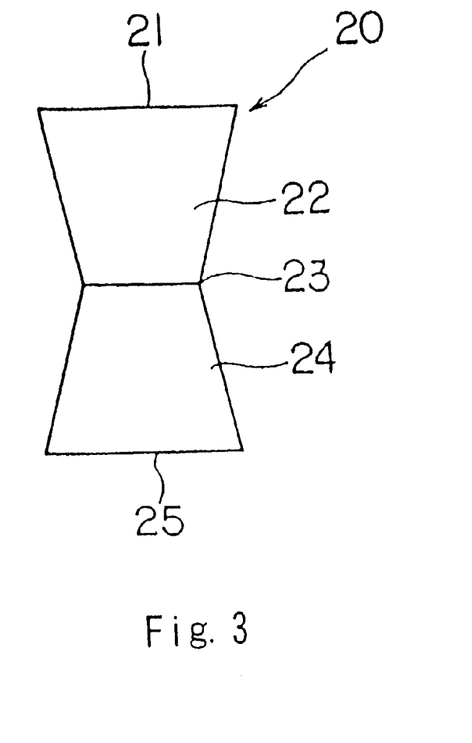
FIG. 3 is a side view of a compressible rubber block according to a first embodiment of this invention.

As shown in FIG. 3, the compressible rubber block 20 which comprises a rubber material has an initial compressible part 23 which partially eliminates the cross section of the block 20. The increase ratio in loads applied to the link 3 gradually increases in response to the amount of compression.

In this embodiment, the shape of the compressible rubber block 20 is made by connecting a respective top surface of two truncated cones, the initial compressible part 23 means connecting surface of two top surface. That is to say, the compressible rubber block 20 has an inverted truncated cone 22 in which the cross sectional area decreases from an upper part 21 to a central part and a truncated cone 24 in which the cross sectional area decreases from a lower part 25 to a central part. The initial compressible part 23 is formed between the inverted truncated cone 22 and the truncated cone 24.

Figure 4:
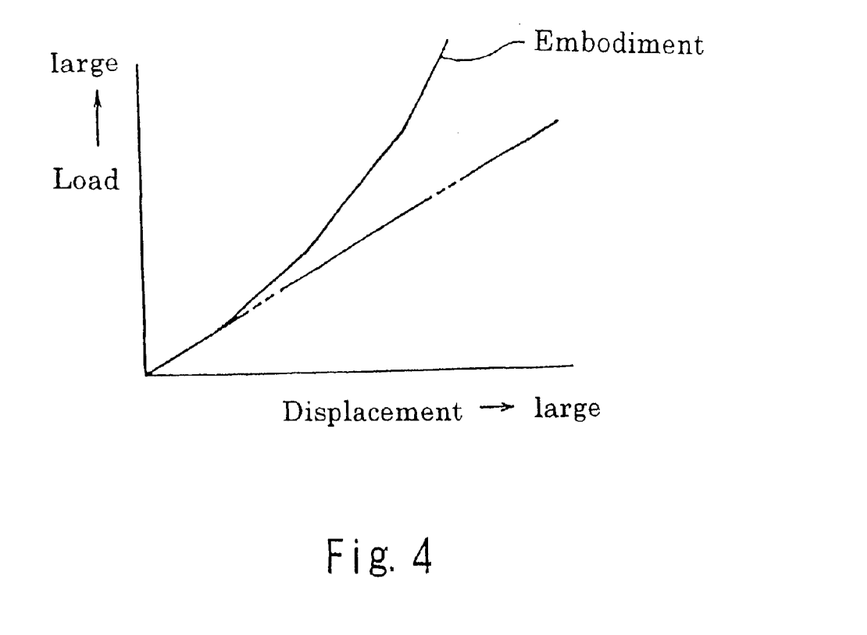
FIG. 4 shows the characteristics of the relationship of amount of displacement of the compressible rubber block and the resilient load on the compressible rubber block according to a first embodiment.

When the compressible rubber block 20 is compressed, it deforms firstly from the initial compressible part 23 which has a smaller cross section. The inverted truncated cone 22 and the truncated cone 24 which sandwich the initial compressible part 23 deform together with increases in the amount of compression. In this manner, the elastic recovery force which is applied by the compressible rubber block 20 rapidly increases. FIG. 4 shows the characteristics of the relationship of the displacement of the link 3 (the amount of compression of the compressible rubber block 20) and a resilient load compressing the compressible rubber block 20 pressing the link 3 downwardly. The increase ratio in the resilient load of the compressible rubber block 20 displays non-linear characteristics and gradually increases as the displacement of the link 3 increases. In FIG. 4, the characteristics of the caster provided with the cylindrical compressible rubber block are shown by the broken line. In this case, the increase ratio in the resilient load of the compressible rubber block 20 is approximately fixed with respect to the amount of displacement of the link.

The inclination of the link 3 is determined by the torsional deformation of the torsional rubber bush 10 in response to loads applied to the body . The link 3 comes into contact with the compressible rubber block 20 in response to an input force on the wheel 4. The compressible rubber block 20 is compressed by such contact and the swinging of the link 3 is damped. Thus it is possible to set a permissible load and damping characteristics of the caster 1 by varying the respective rubber hardness and shape of the rubber of the compressible rubber block 20 and the torsional rubber bush 10.

The compressible rubber block 20 restrains input forces on the body from the link 3 due to the deformation of the initial compressible part 23 with respect to initial input forces on the wheel 4. And with respect to large input forces on the vehicle wheel 4, the compressible rubber block 20 deforms sections other than the initial compressible part 23. In this manner, metal contact is prevented by limiting the rotation range of the link 3 and input forces on the body are restrained by effective shock absorption.

Figure 5:
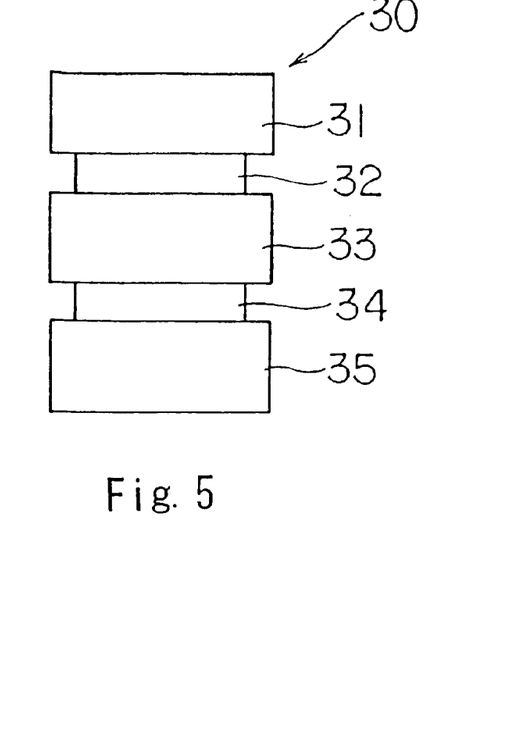
FIG. 5 is a side view of a compressible rubber block according to a second embodiment of this invention.

A second embodiment of this invention will be described below with reference to FIG. 5. A cylindrical compressible rubber block 30 has initial compressible parts 32, 34 at two parts along the compressible rubber block 30 which are formed in an annular shape and have an approximately rectangular-shaped cross section. Furthermore three large diameter parts 31, 33, 35 are provided as to sandwich each initial compressible part 32, 34.

When the compressible rubber block 30 is compressed, the deformation of the block 30 begins firstly from each initial compressible part 32, 34 which has a smaller cross section. After the deformation the initial compressible part 32, 34, large diameter part 31, 33, 35 which sandwiches each initial compressible part 32, 33 begins the deformation and the elastic recovery force which is applied by the compressible rubber block 30 increases rapidly. In this manner, it is possible to absorb effectively the shock to the wheels from the road surface and to decrease the input forces on the body by preventing metal contact between the link 3 and the bracket 2.

A torsional rubber bush 10 is disposed co-axially to the rotational axis of the link 3 and a compressible rubber block 30 is disposed between the bracket 2 and the link 3. As a result, the size of the caster 1 can be reduced.

Figure 6:
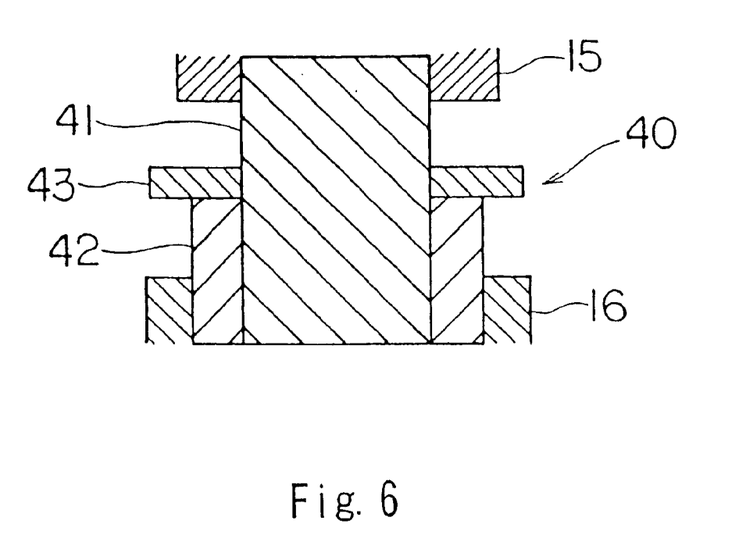
FIG. 6 is a side view of a compressible rubber block according to a third embodiment of this invention.

A third embodiment as shown in FIG. 6 will be described below. A compressible rubber block 40 is provided with a cylindrical initial compressible part 41, a cylindrical part 42 and a disk-shaped metallic retainer 43. The cylindrical initial compressible part 41 is interposed across the bracket 2 and the link 3. The cylindrical part 42 is disposed on the outer periphery of the initial compressible part 41. The disk-shaped metallic retainer 43 is disposed on the outer periphery of the initial compressible part 41 and arranged on the upper face of the cylindrical part 42.

An upper part of the initial compressible part 41 is engaged with a spacer 15 of the bracket 2 and a lower part is engaged to a spacer 16 of the link 3 through the cylindrical part 42.

Figure 7:
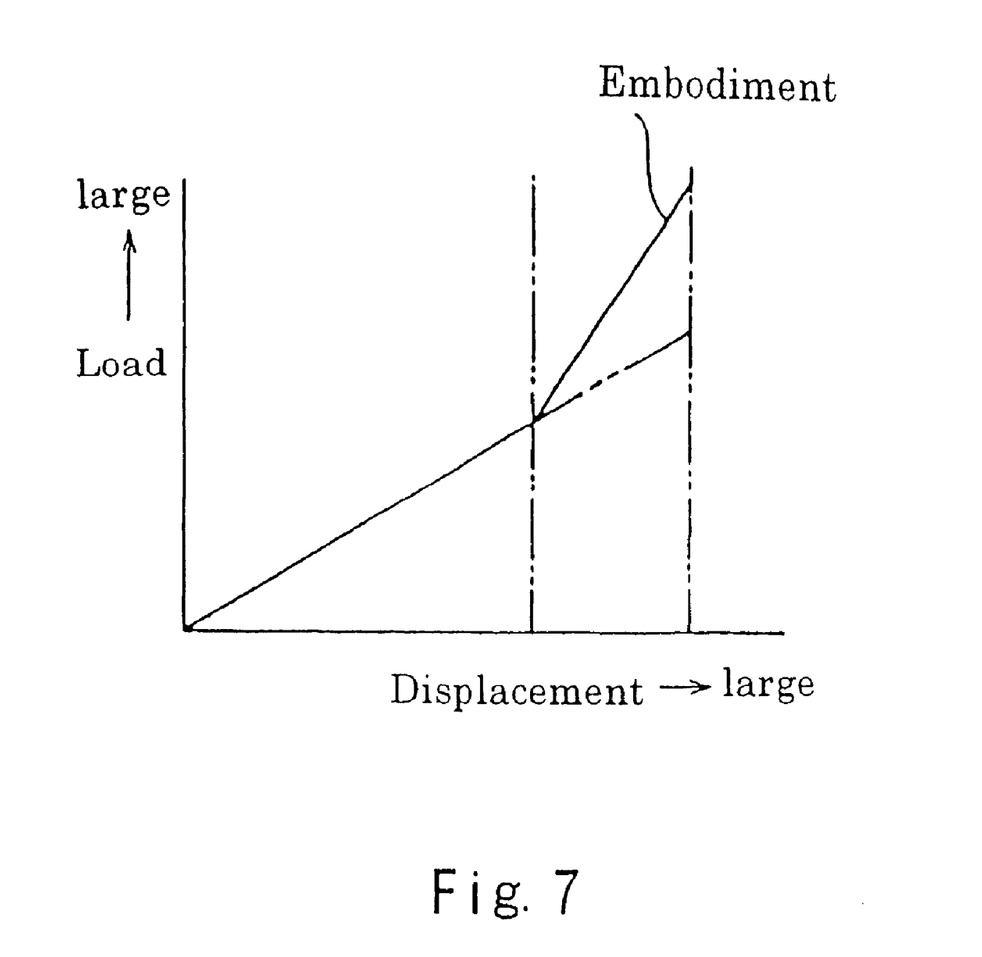
FIG. 7 shows the characteristics of the relationship of amount of displacement of the compressible rubber block and a resilient load on the compressible rubber block.

When the compressible rubber block 40 is compressed, the deformation begins firstly from the initial compressible part 41 which has a smaller cross section. After this deformation, the cylindrical part 42 is compressed according to the contact between the retainer 43 and the spacer 15 of the bracket 2. In this manner, as shown in FIG. 7, the elastic recovery force applied by the compressible rubber block 40 increases rapidly. Thus it is possible to absorb effectively the shock to the wheel from the road surface and to decrease the input forces on the body by preventing metal contact between the link 3 and the bracket 2.

Figure 8:
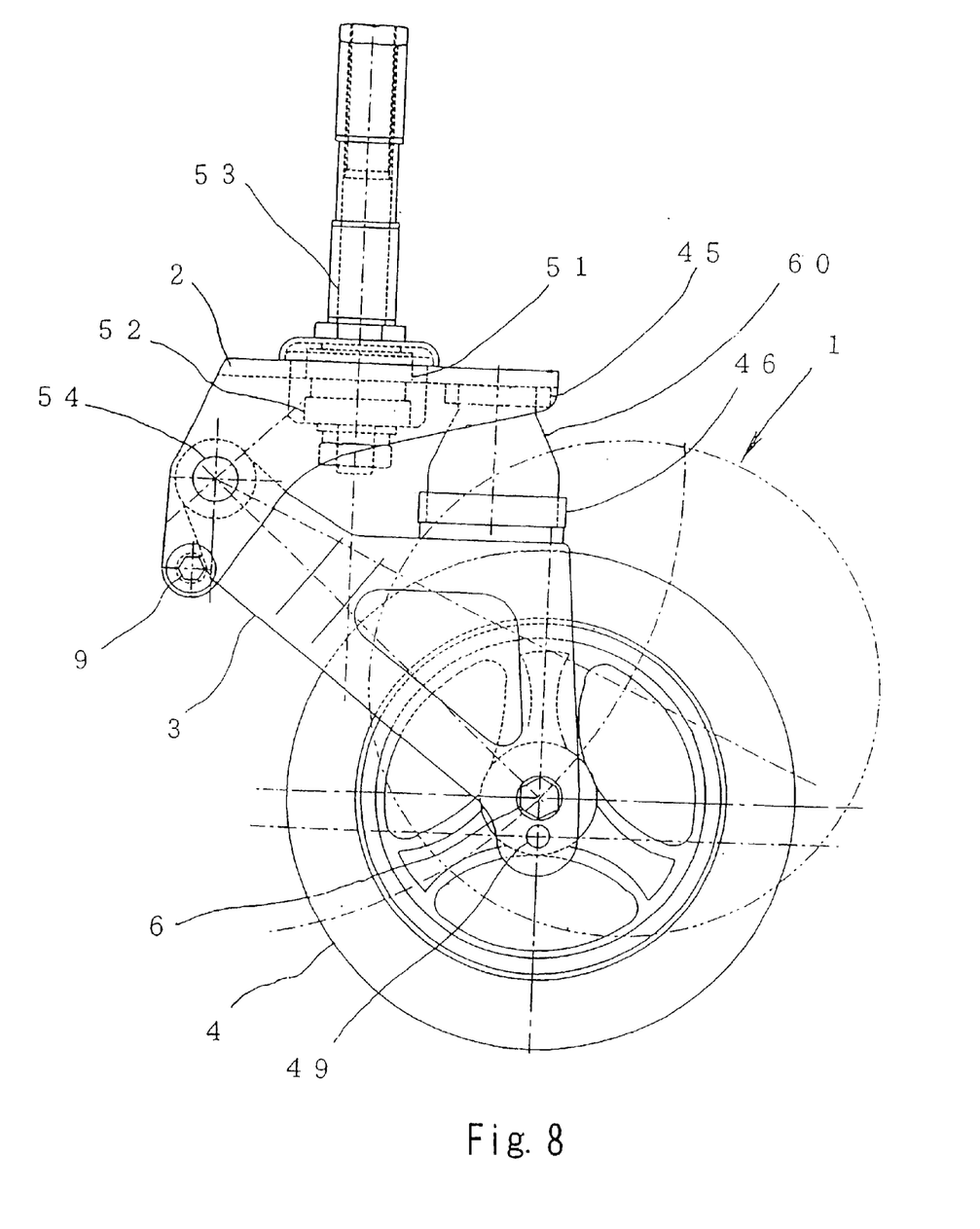
FIG. 8 is a side view of a caster according to a fourth embodiment of this invention.
Figure 9:
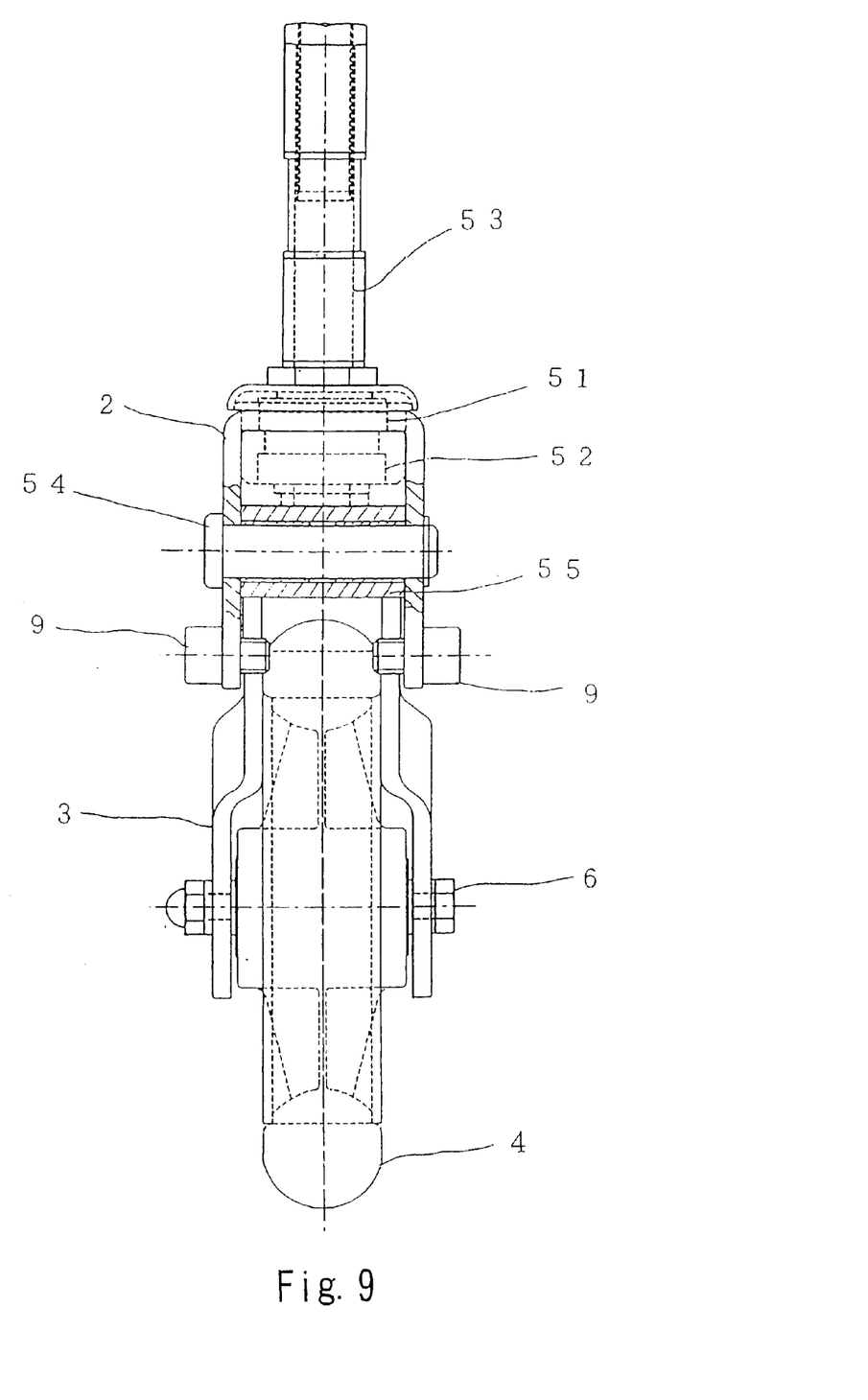
FIG. 9 is a front view of a caster according to a fourth embodiment of this invention.

A fourth embodiment is shown in FIG. 8 and FIG. 9. Those components common to the above embodiments described above are denoted by the same reference numerals.

As shown by FIG. 8, the caster 1 comprises a bracket 2 fixed to the body of a trolley for instance, a link 3 supported as to rotate on the bracket 2 and wheel 4 supported as to rotate on the front end of the link 3.

The wheel 4 is supported through a bolt 6 as to rotate on a front end of the link 3. Although the wheel 4 shown in the figure has a radius of 5 inches, a bolt hole 49 which supports the wheel with a 6 inch radius is formed on the front end of the link 3.

The bracket 2 has a U-shaped cross section and is connected to rotate on the body through bearings 51, 52 by a bolt 53 which passes through an upper section of the bracket 2. The link 3 rotates around a vertical axis (in a transverse direction). The wheel 4 turns to a traveling direction.

As shown in FIG. 9, the link 3 has a U-shaped cross section and is connected to rotate on the bracket 2 through a pin 54 which passes through the rotational center of the link 3. A sleeve 55 is fixed co-axially to the rotational center of the link 3 and the sleeve 55 is engaged slidably on the pin 54.

A pair of stopper bolts 9 are engaged to the bracket 2 to limit the rotation of the link 3 in a downward direction.

A compressible rubber block 60 is mounted to the bracket 2 as to be compressed according to the upward rotation of the link 3. The compressible rubber block 60 begins the compression deformation in response to loads on the body and the inclination of the link 3 is determined by an amount of this deformation. The link 3 rotates as the compressible rubber block 60 is compressed in response to input forces on the wheel 4 from the road surface. In this manner, swinging of the link 3 is restrained and metallic contact is prevented between the link 3 or the wheel 4 and the bracket 2.

Figure 10:
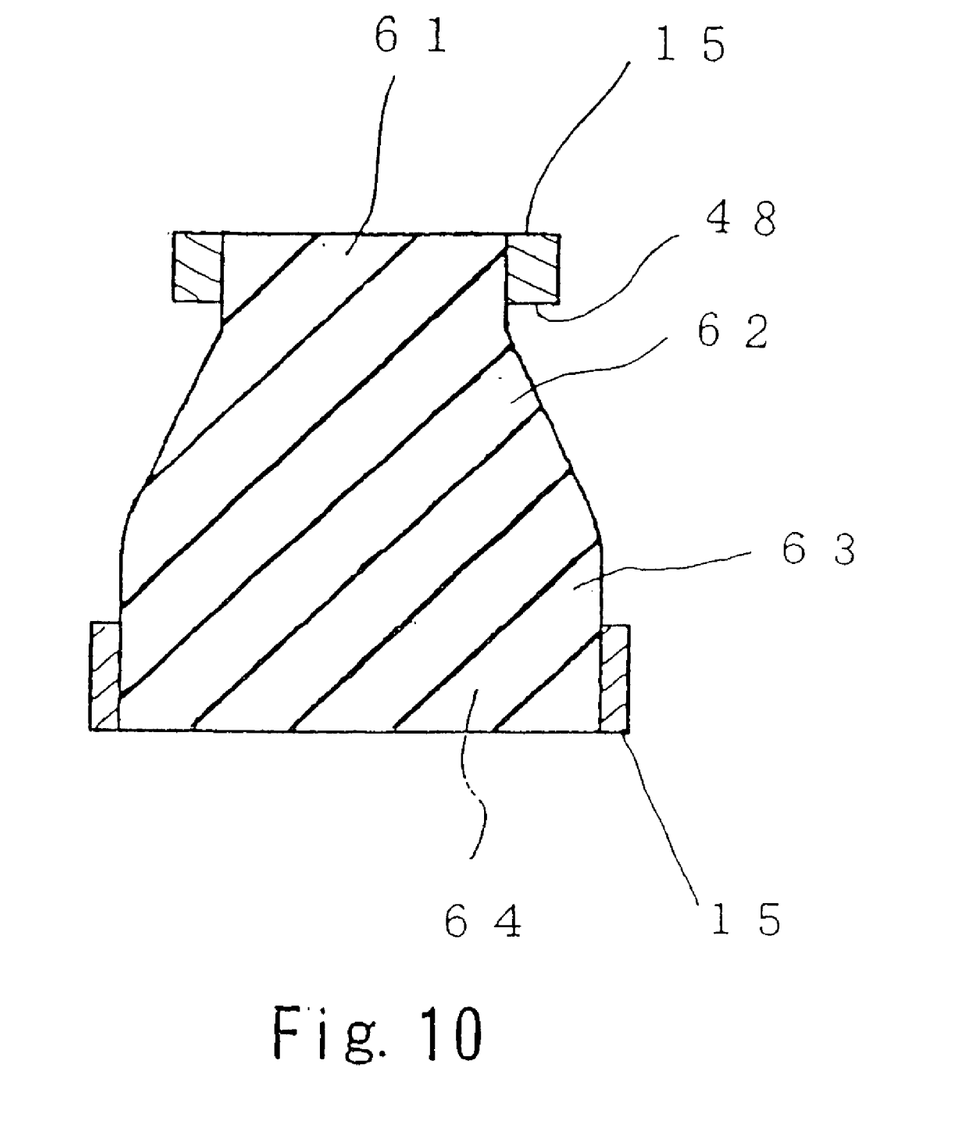
FIG. 10 is a sectional view of a compressible rubber block according to a fourth embodiment of this invention.

As shown in FIG. 10, the cylindrical compressible rubber block 60 comprises a cylindrical upper part 61, a cylindrical lower part 63 and an initial compressible part 62 formed in a conical shape from the lower part 63 to the upper part 61.

An annular spacer 46 is fixed to the link 3 and a lower part 64 of the compressible rubber block 60 is supported on an inner side of the spacer 46.

An annular spacer 45 is fixed to the bracket 2 and the upper part 61 of the compressible rubber block 60 is supported on an inner side of the spacer 45.

When the compressible rubber block 60 is compressed, it deforms firstly from the initial compressible part 62 which has a smaller cross section. The initial compressible part 62 contacts the lower face 48 of an annular fixing seat 45 in response to increases in the amount of compression. The elastic recovery force applied by the compressible rubber block 60 increases rapidly and thus the increase ratio in loads on the link 3 which correspond to the amount of compression gradually increases in response to the amount of compression.

A compressible rubber block 60 arranged as above is compressed in response to loads on the body and the inclination of the link 3 is determined by this deformation. The compressible rubber block 60 is further compressed in response to the input forces on the wheel 4 as the result the swinging of the link 3 is damped. Thus it is possible to set damping characteristics and the load characteristics of the caster 1 on the basis of variations in the rubber hardness and shape of the compressible rubber block 60.

The compressible rubber block 60 smoothes out the rotation of the link 3 and restrains input forces on the body by deforming the initial compressible part 62 with respect to initial input forces on the wheel 4. And with respect to larger input forces on the wheel, in addition to the initial compressible part 62 of the compressible rubber block 60, the other parts 61, 63 begin to deform. Therefore a resilient recovery force applied by the compressible rubber block 60 increases rapidly. Metal contact can be prevented by limiting the rotation range of the link 3 and input forces on the body can be restrained by effective shock absorption.

Figure 11:
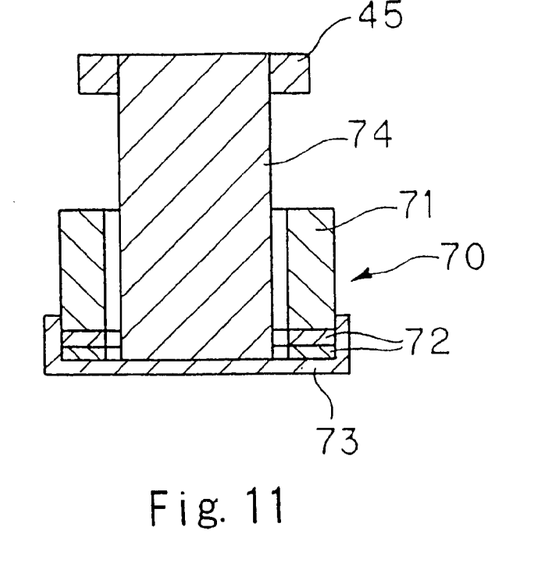
FIG. 11 is a sectional view of a compressible rubber block according to a fifth embodiment of this invention.

Referring to FIG. 11, a fifth embodiment will be explained. This determines the compression ratio of a compressible rubber block 74 by contact between a stopper ring 70 and the spacer 45.

The stopper ring 70 limits the compression ratio of the compressible rubber block 74 and a ring 71 which comes into contact a spacer 45. That is to say, the stopper ring 70 comprises a shim 72 which limits the length between the spacer 45 and the ring 71, and a case 73 which houses the ring 71 and the shim 72.

The inner radius of the ring 71 and the shim 72 is greater than the outer radius of the compressible rubber block 74. The volume of the space which is between the inner radius of the ring 71 and the shim 72, and the outer radius of the compressible rubber block 74 is maintained at a greater value than the rubber volume of the amount of deformation when the compressible rubber block 74 is compressed to a maximum (that is to say, when the spacer 45 and the ring 71 are in contact).

The above arrangement allows the compression ratio of the compressible rubber block 74 to be limited by the contact of the spacer 45 and the ring 71. Thus it is possible to control the stroke amount of the caster accurately and to restrain individual differences in the damping performance resulting from quality difference in the manufacture of the compressible rubber block 74.

Thus it is possible to vary the compression ratio of the compressible rubber block 74, that is to say, to vary the stroke amount of the caster with an extremely simple manner by suitably regulating the number of shims 72.

Figure 12:
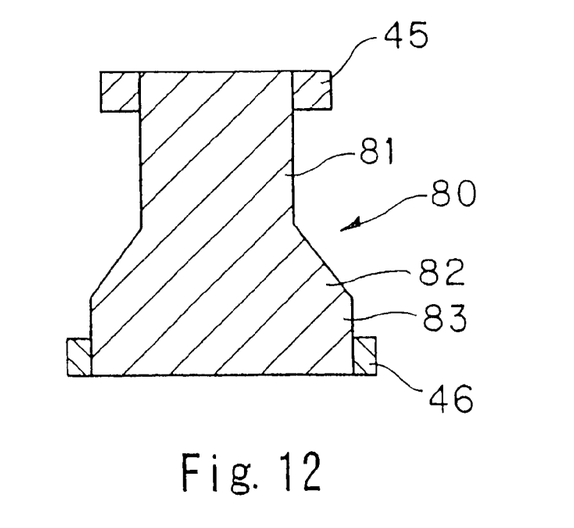
FIG. 12 is a sectional view of a compressible rubber block according to a sixth embodiment of this invention.

A sixth embodiment will be described with reference to FIG. 12 which represents a variation on the shape of the compressible rubber block 60 shown in FIG. 10.

A compressible rubber block 80 in this embodiment comprises a cylindrical upper part 81 which has a smaller diameter, a cylindrical lower part 83 which has a bigger diameter and a tapering compressible part 82 which fastens the upper part 81 and the lower part 83. The ratio of the length of the upper part 81 with respect to the overall length of the compressible rubber block 80 is lengthened in this embodiment in comparison with the fourth embodiment shown in FIG. 10. That is to say, the upper part 81 is lengthened.

Figure 13:
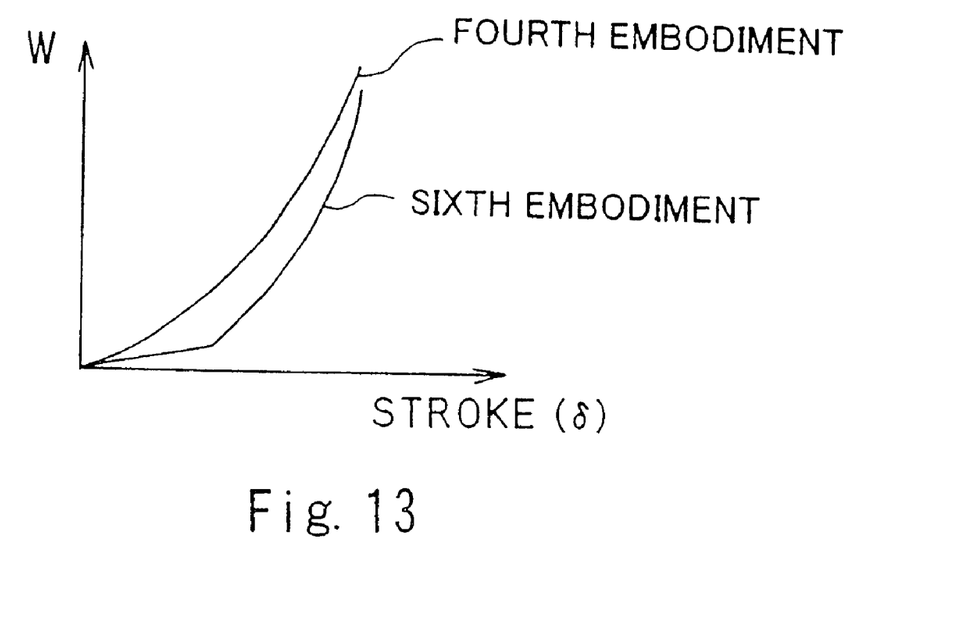
FIG. 13 shows the characteristics of the relationship of amount of displacement of the link and the resilient load on the compressible rubber block according to a sixth embodiment of this invention.

In the above structure, when a load is applied to the compressible rubber block 80, firstly the upper part 81 which has the smaller cross section begins to deform, and then the compressible part 82 and the lower part 83 deform in that order. When this is expressed as load and deformation characteristics of the compressible rubber block, the initial compressible part 62 of the compressible rubber block 60 of the fourth embodiment as shown in FIG. 13 begins to deform as soon as a load is applied. However due to having a conical shape, the initial compressible part 62 immediately displays non-linear deformation characteristics. In contrast, the present embodiment displays linear characteristics up to a fixed amount of deformation since the upper part 81 which has a fixed cross section deforms first. Thereafter, the present embodiment also displays non-linear characteristics as shown in FIG. 13 which are attributable to the characteristics of the compressible part 82 and the lower part 83.

Thus the above structure makes it is possible to soften initial resilient characteristics when a load is applied. This makes it possible to improve the comfort of a trolley or in particular a wheelchair.

Each embodiment for a caster above is not limited to a vehicle which carries goods and may also be used on a wheelchair for example.

Industrial Application

As shown above, the caster according to the present invention restrains input forces on the body by smoothing out the rotation of a link. This is enabled by providing an initial compressible part for a compressible rubber block which deforms with respect to an initial input force applied on wheel. Furthermore sections other than the initial compressible part deform with respect to large input forces on the wheel. In this manner, by limiting the rotational range of the link, metallic contact due to shocks on the bracket is prevented. Therefore the caster may be applied to trolleys or more particularly to wheelchairs.

What is claimed is:

1. A caster, comprising:
   a bracket which is connectable with a body of a vehicle;
   a link having a first end which is rotatably connected with the bracket;
   a wheel which is rotatably connected with a second end of the link;
   a torsional rubber bush disposed at the first end of the link and which torsionally deforms as the link rotates; and
   a compressible rubber block disposed at the second end of the link and which deforms according to the rotation of the link, the compressible rubber block having an initial compressible part which has a decreased cross section relative to a remainder of the compressible rubber block, said torsional rubber bush and said compressible rubber block cooperating together to set a permissible load and damping characteristics of said caster.

2. The caster as defined in claim 1, wherein the compressible rubber block has a cone shape part which forms the initially compressible part having the decreased cross section.

3. The caster as defined in claim 1, wherein the compressible rubber block has a cylindrical shape having a first diameter, at least the initial compressible part having a second diameter that is less than the first diameter.

4. The caster as defined in claim 1, further comprising a retainer provided at a periphery of the compressible rubber block, the retainer coming into contact with a member supporting the compressible rubber block according to a deformation of the initial compressible part.

5. The caster as defined in claim 1, further comprising annular spacers respectively provided at a top side and a bottom side of the compressible rubber block, a maximum amount of compression of the compressible rubber block being determined by an initial contact between the respective spacers as the compressible rubber block is deformed.

6. The caster as defined in claim 5, wherein the annular spacer at the bottom side of the compressible rubber block has a height regulation member which enables a maximum amount of compression of the compressible rubber block to be varied.

7. The caster as defined in claim 1, wherein the cross section of the compressible rubber block is gradually decreased toward a top of the compressible rubber block in a deformation direction of the compressible rubber block; further comprising annular spacers respectively provided at a top side and a bottom side of the compressible rubber block, the respective spacers contacting with the compressible rubber block according to a deformation of the compressible rubber block.

8. The caster as defined in claim 2, further comprising annular spacers respectively provided at a top side and a bottom side of the compressible rubber block, a maximum amount of compression of the compressible rubber block being determined by an initial contact between the respective spacers as the compressible rubber block is deformed.

9. The caster as defined in claim 3, further comprising annular spacers respectively provided at a top side and a bottom side of the compressible rubber block, a maximum amount of compression of the compressible rubber block being determined by an initial contact between the respective spacers as the compressible rubber block is deformed.

10. The caster as defined in claim 4, further comprising annular spacers respectively provided at a top side and a bottom side of the compressible rubber block, a maximum amount of compression of the compressible rubber block being determined by an initial contact between the respective spacers as the compressible rubber block is deformed.

* * * * *